United States Patent Office 3,167,976
Patented Feb. 2, 1965

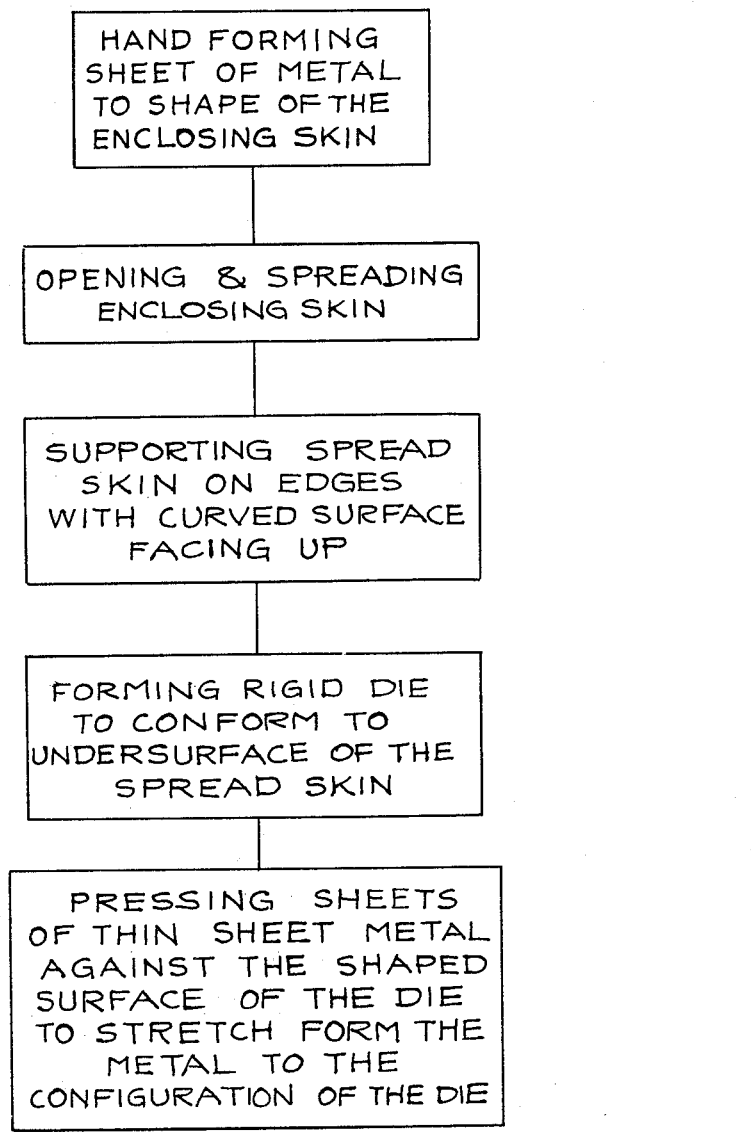

3,167,976
METHOD OF MAKING STRETCH DIE AND METHOD OF STRETCHING ARTICLE THEREON
Romeo A. Lalli, 1805 Stratford Ave., Stratford, Conn.
Filed May 31, 1963, Ser. No. 284,590
6 Claims. (Cl. 76—107)

The present invention relates to a method of making stretch-forming dies and the method of stretching sheets of metal to form an article or device having a compound curved surface, and more particularly to the stretch forming of resilient sheet metal to provide an enclosing skin for a nacelle or the like structure.

Heretofore, because of the complicated compound curvature of the surfaces of aircraft, particularly around nacelles or the like devices, the enclosing skins therefor have been formed individually by hammering or the like hand-forming operation. This is a slow tedious operation and required a high degree of skill in the manufacture of said pieces.

The present invention overcomes the difficulties heretofore encountered by providing a novel method for making a stretch-forming die to accommodate pieces having compound curvatures and a method whereby the skin section can be stretch formed by the die, thus greatly reducing the time needed to produce a plurality of said skin sections. This is accomplished, according to the present method, by hand forming a thin sheet of resilient metal to the shape required to provide the enclosing skin section. The shaped metal sheet is then opened and supported on its edges. A rigid stretching die is then formed with a surface to conform in curvature to the undersurface of the supported sheet and thereafter additional sheets of resilient metal are drawn over the die and stretched to conform to the surface of the die. If desired, the die can be heated so as to facilitate the stretching of the metal to the required shape.

After the pieces have been stretched and set in their stretched shape, they are removed from the die and the inherent resiliency in the metal will cause the sheets to move to a position in which they are substantially the shape of the part to which the skin is applied so that they can be applied with a minimum of effort to produce the required shape on the nacelle or the like.

Other features and advantages of the invention will be apparent from the specification and claims when considered in connection with the accompanying drawing in which the figure shows a flow chart of the process.

While the present invention can be utilized to provide various articles or the like, it will be herein described in connection with the forming of the skin section for enclosing a substantially torpedo-shaped nacelle for an airplane, helicopter or the like which have compound curves in the surface thereof. These skin sections are made of a thin sheet of aluminum alloy or titanium and must be made with various compound curvatures to provide the required enclosure.

In carrying out the method a thin piece of sheet metal of the type required is hammered or hand formed into the shape of the nacelle. The sheet is then opened up or spread out and supported by its spread edges on a flat surface in such a position that the friction between the flat surface and said edges will hold it in its spread position. A rigid stretching die is then made to conform to the undersurface of the thus supported sheet.

While the stretching die can be formed as a solid metal die member, it is at present preferred to form the stretching die by shaping, as by hammering or the like, a relatively thick sheet of steel so as to conform to the undersurface of the formed thin sheet metal in supported spread relation to provide the desired curvature. The shaped steel sheet is then secured to a box frame to form a die such as disclosed in my patent, No. 2,752,982. By this novel method there will be provided a rigid stretching die having a curved surface over which sheet metal or the like material can be pressed and stretched by hydraulic or other suitable pressure until it conforms to the surface of the die.

If the material to be stretched is of a type which requires heat to aid in the stretching thereof, the die can be heated in a manner set forth in the above patent.

After the sheet has been stretched over the die and shaped thereby, it is removed from the die and any excess material in the sheet is trimmed therefrom leaving the remainder in a shape which will, under the resiliency of the metal, assume a shape having the required curvature for the skin portion to enclose the nacelle. The skin can thereafter be secured in position by the usual means.

It will be seen that the present invention greatly simplifies the manufacture of stretching dies for enclosing skins and the like devices and permits said skin sections to be quickly and accurately reproduced where quantity production is required.

Variations and modifications may be made within the scope of the claims and portions of the improvements may be used without others.

I claim:
1. The method of stretch forming thin sheets of resilient metal to produce a predetermined compound curvature therein, comprising the steps of hand shaping a sheet of thin, resilient metal to the required shape having said compound curvature, spreading the hand shaped sheet and supporting the spread sheet solely on the side edges thereof on a flat surface so that the friction between the flat surface and the edges will hold the resilient sheet in said spread position, forming a rigid die to the shape of the hand shaped sheet in said supported position, and thereafter drawing sheets of said metal over the die and stretching the sheets into surface contact with the die to provide sheets that will revert to the required compound curvature when removed from the die.

2. The method of stretch forming sheet metal skins provided with a surface configuration having a predetermined compound curvature, comprising the steps of hammering a sheet of thin, resilient metal to the required shape having said compound curvature, spreading the hammered sheet and supporting the same on the side edges thereof on a flat surface so that the friction between the flat surface and the edges will hold the resilient sheet in said spread position and with the curved outer surface facing upwardly, making a rigid die to the shape of the undersurface of the skin in supported position to provide a rigid stretching die, and drawing a sheet of said metal over the die and stretching the sheet into surface contact with the die to provide a sheet that will revert to the required compound curvature.

3. The method of stretch forming sheet metal enclosure skins provided with a surface configuration having a predetermined compound curvature, comprising the steps of hammering a sheet of thin, resilient metal to the required shape of the enclosure having said compound curvature, spreading the hammered sheet and supporting the same on the side edges thereof on a flat surface so that the friction between the flat surface and the edges will hold the resilient sheet in said spread position and with the outer surface facing upwardly, hammering a sheet of steel to the shape of the undersurface of the enclosure skin in supported position, mounting the steel sheet on a box frame to form a rigid stretching die, and drawing a sheet of said metal over the die and stretching the sheet into surface contact with the die to provide a sheet that will revert to the required compound curvature.

4. The method of making a die for stretch forming sheets of thin, resilient metal to produce shaped articles provided with a predetermined compound curvature, comprising the steps of opening and spreading a formed and shaped sheet having said compound curved surface, supporting the opened and spread shaped sheet on the side edges thereof on a flat surface so that the friction between the flat surface and the edges will hold the resilient sheet in said spread position and with the curved surface facing upwardly, and forming a rigid die with a surface having the shape of the undersurface of the sheet in said supported position, said die surface being adapted to have sheets of metal for forming the articles stretched into contact therewith to provide articles, when removed from the die, having the required compound curvature.

5. The method of making a die for stretch forming sheets of thin, resilient metal to produce shaped enclosing skins provided with a predetermined compound curvature, comprising the steps of opening and spreading a formed and shaped enclosing skin having said compound curvature, supporting the opened and spread sheet metal skin on the side edges thereof on a flat surface so that the friction between the flat surface and the edges will hold the resilient sheet in said spread position and with the outer curved surface facing upwardly, and forming a rigid die with a surface having the shape of the undersurface of the skin in supported position, said surface being adapted to have sheets of metal forming the skins stretched into contact therewith to provide an enclosing skin, when removed from the die, having the required compound curvature.

6. The method of making a die for stretch forming sheets of thin, resilient metal to produce shaped enclosing skins provided with a predetermined compound curvature, comprising the steps of opening and spreading a formed and shaped enclosing skin having said compound curvature, supporting the opened and spread sheet metal skin on the edges thereof on a flat surface so that the friction between the flat surface and the edges will hold the resilient sheet in said spread position and with the outer surface facing upwardly, shaping a steel sheet with a surface having the shape of the undersurface of the skin in supported position, and mounting said sheet on a box frame to form a rigid stretching die, said surface being adapted to have the sheet metal for forming the enclosing skin stretched into contact therewith to provide a skin, when removed from the die, having the required compound curvature.

References Cited by the Examiner

UNITED STATES PATENTS

| 2,383,706 | 8/45 | Burger et al. | 76—107 |
| 2,503,630 | 4/50 | Norton | 76—107 |
| 2,752,982 | 7/56 | Lalli | 76—107 |

GRANVILLE Y. CUSTER, Jr., *Primary Examiner.*

ARTHUR M. HORTON, *Examiner.*